Patented Sept. 18, 1934

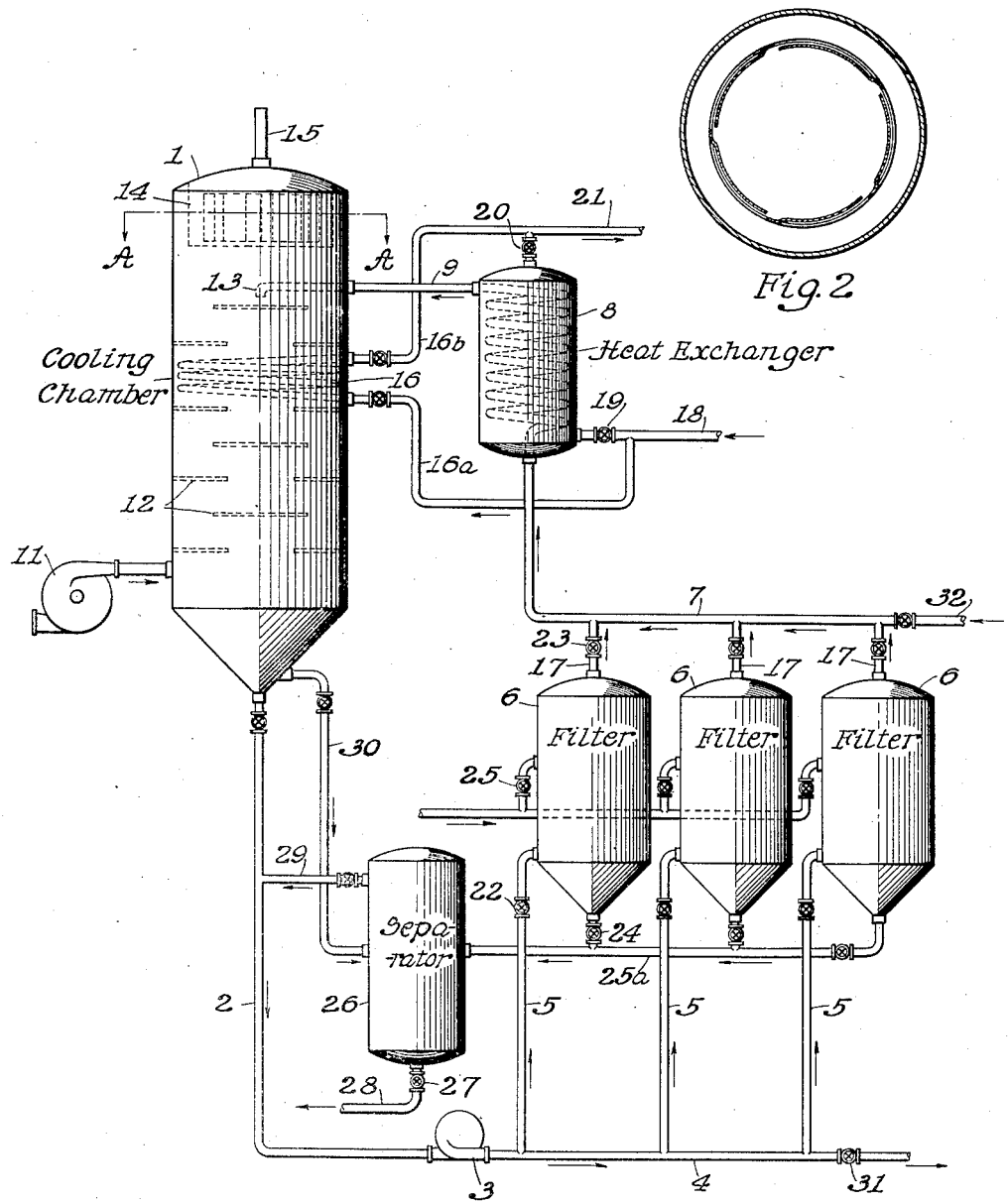

1,974,145

UNITED STATES PATENT OFFICE 1,974,145

AIR CONDITIONING

Harold V. Atwell, Bayside, N. Y., assignor to Standard Oil Company, Chicago, Ill., a corporation of Indiana Application June 30, 1932, Serial No. 620,117

6 Claims. (Cl. 183—120)

This invention relates to a process of conditioning gases, and particularly air intended for ventilation of dwelling houses, theaters, and offices, as well as for industrial purposes. The object of the invention is to provide a process for controlling the humidity and temperature of gases. Another object is to purify gases which contain suspended impurities and odors. The process will be fully understood from the following description of a typical embodiment of the invention.

In the accompanying drawing which forms a part of this specification:

Figure 1 is a diagrammatic elevation of my improved system with parts shown in vertical section, and Figure 2 is a horizontal section taken along the lines A—A of Fig. 1.

Cooling chamber 1 is connected by line 2 to pump 3, manifold 4 and lines 5 to filters 6. Manifold 7 leads from filter 6 to heat exchanger 8 which in turn is connected by line 9 to cooling chamber 1. The functions of the various pieces of equipment described in the drawing will be made clear as the description of the process proceeds.

In carrying out the process, air or other gases containing impurities, as previously mentioned, including moisture, is introduced by blower 11 into cooling chamber 1. The cooling chamber is provided with suitable baffles 12, forcing the air to flow in a tortuous path. As the air ascends in the cooling chamber it meets a stream of oil which is introduced by nozzle 13 and which flows countercurrent to the air ascending the cooling chamber. The direct contact between the oil and the air results in a rapid equalization of temperature and, in addition, impurities in the air are absorbed by the flowing stream of oil as it descends in sheets and drops through the baffled portion of the chamber. For most purposes, it is desired to reduce the temperature of the air and this is preferably accomplished by supplying the oil to the cooling chamber at a lower temperature than that of the air.

After the oil scrubbing operation, the air is passed into entrainment remover 14 as illustrated diagrammatically in Figure 2. The design of this part of the apparatus is conventional and forms no part of the present invention. The air enters the entrainment remover tangentially and this receives a cyclonic motion which increases in intensity toward the central part of the device where the outlet is located. This action effectually frees the air from suspended oil particles which might otherwise be carried away with it and the washed, cooled, and purified air is discharged by outlet 15.

If desired, all or a portion of the cooling of chamber 1 may be supplied by cooling coil 16 connected to liquid supply by line 16a and discharging through line 16b. A liquefied refrigerant may be introduced into the cooling coils through a suitable expansion valve, or cold brine may be circulated through coils 16. The oil, flowing over the coil, prevents frost accumulating thereon.

The oil which descends through the cooling chamber collects in the base thereof and is withdrawn by line 2 to pump 3 where it is forced into manifold 4 and pipe 5 to filter 6. These filters are not shown in detail and may be of any conventional construction. It is preferred, however, to employ filters of the multiple, stationary leaf type. In most operations it is desirable to reduce the temperature of the air below 0° C., in which case any moisture which it contains will be converted to ice which is subsequently carried in suspension in the oil cooling medium to the filters 6. The ice or frost is here deposited on the plates of the filters which are thoroughly heat insulated to prevent melting of the filter cake. Other solid impurities contained in the air, such as dust particles, soot particles, etc., are likewise collected in the filters along with the ice particles.

The filtered oil is discharged from the filters through outlets 17 into manifold 7 where it is led to heat exchanger 8. Here its temperature is reduced by indirect contact with liquid ammonia or other suitable refrigerant supplied to the heat exchanger by line 18 and expansion valve 19. Ammonia vapors are discharged through outlet 20 and line 21 where they are led to a suitable absorber or compressor in a conventional ammonia refrigeration system. The cold oil is returned by line 9 to nozzle 13 located in chilling chamber 1.

In the normal operation of the process it will become necessary, from time to time, to remove the accumulated solids from the filters. These solids consist principally of frost which has been removed from the oil and it may most conveniently be removed from the filter leaves by isolating a single filter as necessary, which can be done by closing valves 22 and 23 for example. Valve 24 may then be opened and a suitable heating medium, for example steam, may be admitted to the filter by valve 25, raising the temperature sufficiently to melt the accumulated frost. The water and oil which results from this melting operation are discharged from the filter by valve 24 and line 25a which leads to separating drum 26. Here the water is permitted to separate from the oil and is discarded through valve 27 and line 28. The oil is allowed to overflow through line 29 leading into line 2 previously described. The separator drum may likewise be employed to separate mixtures of water and oil obtained in cooling chamber 1. Valved line 30 is provided for conveying these mixtures to the separator. After the cake has been melted and discharged from the filter the valves may be reset for continuing the filtration as previously described. Other means may be used for removing the filter cake without melting it on the filter leaves, for example, the cake may be mechanically dislodged or scraped from the filter leaves and discharged in solid form or melted by a suitable heating coil in the base of the filter. Also, I contemplate settling or centrifuging solids from the oil-cooling medium, both of which methods may be employed successfully.

As the cooling medium in this process, I employ a mineral oil of low volatility, preferably a highly treated mineral oil, commonly known as white oil. Cooling media of this type offer numerous advantages unsuspected by the prior art. One advantage of the use of oils in direct contact with refrigeration of gases results from the fact that the impurities which are contained in the gases, either suspended or in vapor form, are more completely and effectively removed than has heretofore been accomplished. This result may be attributed to the remarkable solvent power of mineral oils for odor substances and also to the low surface tension of the mineral oils as opposed to aqueous liquids. Applicant is familiar with the use of aqueous brine in direct contact refrigeration of gases, but has found his process to be markedly superior thereto in the above respects. Another advantage of my process over brine cooling processes lies in the easy removal of separated moisture from the oil in my process. Where brine is employed as a refrigerating medium the moisture which separates from the air being treated accumulates in the brine and rapidly dilutes it to a point where reconcentration is made necessary. This requires the use of expensive heating and evaporation equipment. Refrigeration is naturally sacrificed in this process.

The oils employed in this process are preferably those having viscosities in the range of 100 to 300 seconds Saybolt at 100° F., although somewhat lighter oils may be employed without encountering serious difficulty with excessive vapor pressure. Heavier oils are less desirable because of excessive viscosity when subjected to the low temperatures necessary for dehydrating the air and other gases treated. Where the process is employed for conditioning air for theaters, dwellings and other places where the odor of the air is extremely important, it is desirable to employ the highly treated white oils previously mentioned. These oils are produced from mineral oil distillates by subjecting them to vigorous treatment with strong sulfuric acid and preferably fuming sulfuric acid followed by separation of the sludge and neutraliaztion and filtration of the oil. As soluble impurities accumulates in the oil, portions of it may be removed from the system from time to time by valved outlet 31 and fresh or repurified oil may be added to the system by valved inlet 32. The impure oils so removed from the system may be subjected to a simple refining operation such as filtration through fuller's earth or treatment with strong caustic solution after which it may be returned to the system.

My process provides a means of producing dried refrigeration gases in a state of purity heretofore very difficult to obtain. One of the special adaptations of the process is in the drying of gelatin and other food products where the operation must be conducted at a low temperature and in the presence of an atmosphere which is substantially free from bacterial contamination. Although I have described my process by referring to a specific embodiment thereof, the scope of this invention is intended to be limited only by the following claims:

I claim:

1. The process of conditioning air, comprising subjecting the air to direct contact with a non-volatile mineral oil which is at a temperature below the dew point of the air, and removing separated moisture in contact with the oil.

2. The process of claim 1 wherein the non-volatile mineral oil is a white oil.

3. The process of refrigerating, drying and deodorizing air in ventilating systems, comprising passing the air in contact with a refrigerated non-volatile oil whereby moisture is precipitated from the air as water and ice, separating the water and ice from the oil, refrigerating the oil and returning the oil to the contacting operation.

4. The process of claim 3 wherein the oil is subjected to refrigeration after separating and before recycling in contact with the air.

5. The process of claim 3 wherein the separation of frost is accomplished by filtration.

6. The process of claim 3 wherein the non-volatile mineral oil employed is a white oil.

HAROLD V. ATWELL.